UNITED STATES PATENT OFFICE.

KARL LOUIS FELIX FRIEDEMANN, OF FORSHAGA, SWEDEN.

PROCESS FOR RENDERING SOLUBLE THE PRODUCTS OF OXIDATION OF LINSEED-OIL.

1,095,838.  Specification of Letters Patent. Patented May 5, 1914.

No Drawing.  Application filed January 6, 1913. Serial No. 740,461.

*To all whom it may concern:*

Be it known that I, KARL LOUIS FELIX FRIEDEMANN, a citizen of the Kingdom of Sweden, residing at Forshaga, Sweden, have invented a new and useful Improved Process for Rendering Soluble the Products of Oxidation of Linseed-Oil, of which the following is a specification.

This invention relates to a process for rendering soluble the products of oxidation of linseed oil by organic solvents boiling at a low temperature, such as alcohol, chloroform, benzol and the like.

It is a well known fact that the products of oxidation of linseed oil, which have been obtained by oxidation effected by introducing air or other gases rich in oxygen into the linseed oil at a comparatively low temperature, and which products consist probably of "linoxyn" ($C_{32}H_{54}O_{11}$) and "linoxynic" acid ($C_{16}H_{28}O_6$) have found a comparatively wide scope of application in the various arts. They form for instance the elastic substance of linoleum, linoleum carpets and the like. Further it has frequently been suggested to use these oxidation products as substitutes for rubber. These oxidation products, however, could hitherto only be used in connection with those industrial processes which permitted said products being either kneaded or fused together with other substances, whereas in cases where only solutions can be used it was impossible to employ said products, as hitherto they were considered to be practically insoluble.

There are it is true, some instances where one succeeded in producing cloudy or muddy, viscous and even gelatinous solutions, but it has never been possible to make them of such a high percentage or strength that they could be used for practical purposes.

This invention allows of rendering soluble the products of oxidation of linseed oil ("linoxyn" and "linoxynic" acid) in the majority of solvents. By this means a new and extensive scope of application is opened up to the products of oxidation of linseed oil. Among others, the following new applications of these products may be mentioned, namely the impregnation of all kinds of textile fabrics in order to render them water-proof or capable of resisting the action of water, and the impregnation of leather for the purpose of rendering the same water-proof or for increasing its resistance to wear.

The invention substantially consists in treating the products of oxidation of linseed oil, chiefly "linoxyn" and "linoxynic" acid, with a concentrated fatty acid having a moderate or low boiling point, preferably acetic acid, and in partially or wholly evaporating said acid. The product thus obtained is soluble, for instance, in alcohol, chloroform, benzol, and other solvents. The solutions are perfectly clear, possess a comparatively low degree of viscosity, and may be made of very great strength.

The process may be carried out for instance in the following manner: About the same parts of weight of oxidation products of linseed oil and concentrated acetic acid are mixed together and boiled about one hour. Thereupon the greater part of the acetic acid, about 70-80%, is distilled off whereupon the remaining acetic acid or a part thereof is allowed to evaporate while the product is stirred and cooled.

It is preferable to have a small per cent. of the acetic acid remain in the product in order to prevent the latter from being burnt, such product, as is the case with oxidized linseed oil when not mixed with a fatty acid, being very sensitive to temperatures above its melting point (about 125° C.), and the complete removal of the acetic acid therefore must be carried out with great care suitably by means of a source of heat that is not capable of heating the product over 125° C. If this temperature is passed it easily happens that the oxidized linseed oil product is converted into an insoluble modification.

A few examples for employing the product obtained by treating it with concentrated acetic acid for impregnation purposes will be described in the following: In cases where the articles to be manufactured must possess a high degree of elasticity and must be capable of resisting the effects of frequent bending and the tendency to crack, which applies for instance to tarpaulins, yarn, leather for the uppers of footwear, and the like, preferably solutions of oxidation products of the linseed oil in aromatic thin hydrocarbons may be employed. The strength of the solutions varies in accordance with the purpose for which the articles are intended. Articles impregnated with such solutions are not only water-proof, but also more durable than before. Further after the solvent has been evaporated, the impregnated articles are perfectly dry and odorless and do not become brittle, which often happens after the lapse of some time in connection with such articles which have been impregnated with preparations mainly consisting of linseed oil and linseed oil varnish.

For the purpose of impregnating substances which need not possess such a high degree of elasticity, for instance, leather used for the soles of boots, and the like, a greater or smaller quantity of resins and copals may be added to the oxidation products of the linseed oil, in which case said additions may be dissolved simultaneously with the oxidation products in the acetic acid. After the acetic acid has been evaporated, the same secondary solvents as mentioned in the first example may be employed. For the purpose of impregnating leather used for making soles, a 40% alcoholic solution is for instance prepared in which the leather is placed and allowed to remain therein for a few hours. This treatment may if required be repeated one or more times. Leather which has been impregnated in this manner is capable of offering great resistance to wear without its elasticity being substantially diminished.

Having now described my invention what I claim as new and desire to secure by Letters Patent is:

1. The process of rendering soluble the products of oxidation of linseed oil in organic solvents, which consists in boiling a mixture of said oxidation products and a concentrated fatty acid at a temperature of 100 to 150° C., and thereafter evaporating said acid.

2. The process of rendering soluble the products of oxidation of linseed oil in organic solvents, which consists in boiling a mixture of said oxidation products and concentrated acetic acid, and thereafter evaporating said acid.

3. The process of rendering soluble the products of oxidation of linseed oil (linoxyn and linoxynic acid) in organic solvents, which consists in mixing together said oxidation products and a concentrated fatty acid boiling at a temperature of 100 to 150° C., and thereafter evaporating said acid.

4. The process of rendering soluble the products of oxidation of linseed oil (linoxyn and linoxynic acid) in organic solvents, which consists in mixing together about like parts of weight of said oxidation products and of concentrated acetic acid, boiling the mixture about one hour, and evaporating the main part of the acetic acid.

In testimony that I claim the foregoing as my invention, I have signed my name in presence of two subscribing witnesses.

KARL LOUIS FELIX FRIEDEMANN.

Witnesses:
CONRAD DELMAR,
JOHN DELMAR.